US008744345B2

(12) United States Patent
Goto

(10) Patent No.: US 8,744,345 B2
(45) Date of Patent: Jun. 3, 2014

(54) COMMUNICATION APPARATUS AND COMMUNICATION METHOD THEREFOR

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 544 days.

(21) Appl. No.: 12/599,972

(22) PCT Filed: Jul. 4, 2008

(86) PCT No.: PCT/JP2008/062532
§ 371 (c)(1),
(2), (4) Date: Nov. 12, 2009

(87) PCT Pub. No.: WO2009/011291
PCT Pub. Date: Jan. 22, 2009

(65) Prior Publication Data
US 2010/0234056 A1    Sep. 16, 2010

(30) Foreign Application Priority Data
Jul. 18, 2007    (JP) .................................. 2007-187149

(51) Int. Cl.
*H04B 7/185*    (2006.01)
(52) U.S. Cl.
USPC ........................................ 455/13.1; 455/434
(58) Field of Classification Search
USPC ............................. 455/11.1, 13.1, 235.1, 231
See application file for complete search history.

(56) References Cited

U.S. PATENT DOCUMENTS

| | | | |
|---|---|---|---|
| 7,555,056 B2 | 6/2009 | Hara et al. | 375/295 |
| 2006/0142034 A1 | 6/2006 | Wentink et al. | 455/515 |
| 2007/0060048 A1* | 3/2007 | Kang et al. | 455/13.1 |
| 2007/0121521 A1* | 5/2007 | D'Amico et al. | 370/252 |
| 2007/0208847 A1* | 9/2007 | Knauerhase et al. | 709/223 |
| 2008/0089300 A1 | 4/2008 | Yee | 370/338 |
| 2010/0046394 A1 | 2/2010 | Fujii et al. | 370/254 |

FOREIGN PATENT DOCUMENTS

| | | |
|---|---|---|
| EP | 1641184 | 3/2006 |
| EP | 1701479 | 9/2006 |
| JP | 2003-338821 | 11/2003 |
| JP | 2004-127187 | 4/2004 |
| WO | 01/92992 | 12/2001 |

OTHER PUBLICATIONS

U.S. Appl. No. 12/439,823, filed Mar. 3, 2009, Inventor: Fumihide Goto.

* cited by examiner

*Primary Examiner* — Tu X Nguyen
(74) *Attorney, Agent, or Firm* — Fitzpatrick, Cella, Harper & Scinto

(57) ABSTRACT

To detect a provider of communication parameters, a communication apparatus executes control so that when a signal for searching for the provider of the communication parameters is sent, an apparatus which does not serve as the provider decreases the frequency of responding to the search signal and the provider increases the frequency of responding to the search signal.

22 Claims, 12 Drawing Sheets

COMMUNICATION APPARATUS AND COMMUNICATION METHOD THEREFOR

TECHNICAL FIELD

The present invention relates to a communication apparatus and a communication method therefor.

BACKGROUND ART

In wireless communication represented by a wireless LAN complying with the IEEE802.11 standard series, there are many setting items to be set in advance. The setting items include communication parameters necessary for wireless communication, such as an SSID (Service Set IDentifier) as a network identifier, an encryption method, an encryption key, an authentication method, and an authentication key. It is very troublesome for a user to set them by manual input.

Various manufacturers have proposed automatic setting methods for easily setting communication parameters in a wireless apparatus. In those automatic setting methods, one apparatus provides another apparatus with communication parameters using a procedure predetermined between these connected apparatuses and a message, thereby automatically setting the communication parameters.

As for the communication parameter automatic setting method, each manufacturer often employs its own proprietary method. Procedures for setting communication parameters or interpretable messages are different between apparatuses which do not support a common communication parameter automatic setting method. In this case, it is impossible to set communication parameters using the automatic setting method. On the other hand, between apparatuses which support a common communication parameter automatic setting method, it is possible to easily set communication parameters using the automatic setting method.

Japanese Patent Laid-Open No. 2003-338821 has disclosed an example of communication parameter automatic setting.

A communication parameter automatic setting method requires a role of "provider" which provides another wireless apparatus with communication parameters and a role of "acceptor" which receives the communication parameters provided by the provider and sets them in the acceptor itself.

Therefore, when a wireless apparatus needs to receive communication parameters by automatic setting, it must search for a provider that can provide those communication parameters.

However, since the provider does not necessarily respond to a signal for searching for a provider, it is impossible to easily search for a provider of the communication parameters.

In an ad-hoc network (IBSS: Independent Basic Service Set) complying with the IEEE802.11 standard, a station which has transmitted a beacon last returns a response to a probe request as a search request signal. This means even if a given apparatus transmits a probe request to search for a provider, an apparatus other than the provider may respond. It is therefore difficult to find a provider of the communication parameters.

DISCLOSURE OF INVENTION

It is an object of the present invention to easily and quickly find a provider which provides communication parameters.

According to one aspect of the present invention, a communication apparatus comprises: a receiving means which receives a search signal for searching for a provider of communication parameters; and a notification means which notifies, upon reception of the search signal by the receiving means, the provider of the reception of the search signal.

According to another aspect of the present invention, a communication apparatus comprises: a receiving means which receives a search signal for searching for a provider of communication parameters; and a transmission control means which controls, upon reception of the search signal by the receiving means, transmission of a signal from the apparatus so that another communication apparatus becomes an apparatus which responds to the search signal.

According to still another aspect of the present invention, a communication apparatus comprises: a detection means which detects a reception notification of a search signal for searching for a provider of communication parameters; and a transmission control means which controls, upon detection by the detection means, transmission of a signal from the apparatus so that the apparatus becomes an apparatus which responds to the search signal.

According to yet another aspect of the present invention, a communication method for a communication apparatus, comprises: a determination step of determining that the communication apparatus receives a search signal for searching for a provider of communication parameters if the communication apparatus is not the provider of the communication parameters; and a notification step of notifying the provider that the communication apparatus has received the search signal if it is determined in the determination step that the communication apparatus has received the search signal.

According to still yet another aspect of the present invention, a communication method for a communication apparatus, comprises: a determination step of determining that the communication apparatus has received a search signal for searching for a provider of communication parameters if the communication apparatus is not the provider of the communication parameters; and a control step of suppressing transmission of a broadcast signal from the communication apparatus or decreasing a transmission frequency of the broadcast signal so that another communication apparatus becomes an apparatus which responds to the search signal, if it is determined in the determination step that the communication apparatus has received the search signal.

According to yet still another aspect of the present invention, a communication method for a communication apparatus, comprises: a determination step of determining that a search signal for searching for a provider of communication parameters has been received; and a control step of increasing a transmission frequency of a broadcast signal of the communication apparatus so that the communication apparatus becomes an apparatus which responds to the search signal, if it is determined in the determination step that the search signal has been received.

According to the present invention, it is possible to easily and quickly find a provider which provides communication parameters.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

<First Embodiment>

A wireless communication apparatus according to the present invention will be described in detail below with reference to the accompanying drawings. Although a case in which a wireless LAN system complying with the IEEE802.11 standard series is used will be explained blow, a communication method is not necessarily limited to a wireless LAN.

A hardware configuration in the preferred embodiment will be described.

Figure 1:
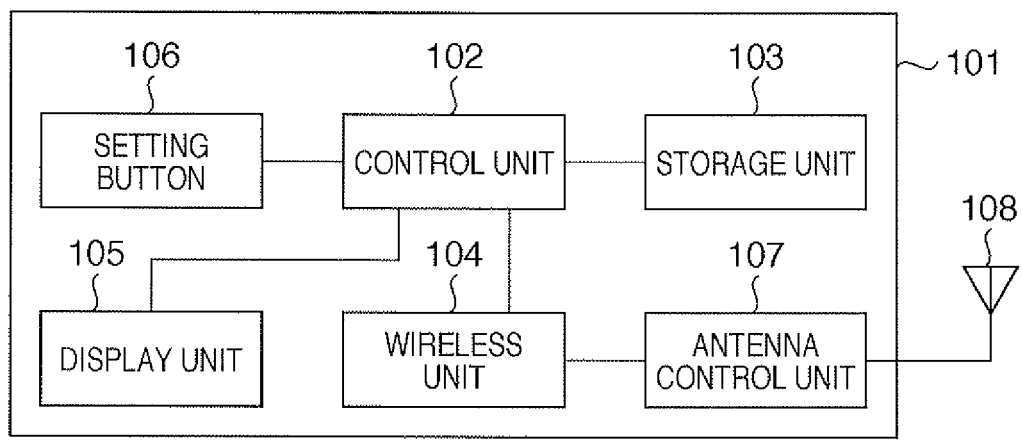
FIG. 1 is a block diagram showing the configuration of a terminal according to embodiments of the present invention.

FIG. 1 is a block diagram showing a configuration of each terminal (to be described later) according to embodiments to which the present invention is applicable. Reference numeral 101 denotes a terminal as a whole; and 102, a control unit which controls the terminal as a whole by executing control programs stored in a storage unit 103. The control unit 102 also controls communication parameter setting with another terminal. The storage unit 103 stores the control programs executed by the control unit 102 and various pieces of information such as communication parameters. Various operations (to be described later) are performed when the control unit 102 executes the control programs stored in the storage unit 103. Reference numeral 104 denotes a wireless unit for wireless communication; 105, a display unit which provides various displays and has a function capable of outputting visually perceivable information like an LCD (Liquid Crystal Display) or LED (Light Emitting Diode), or a function capable of outputting a sound like a loudspeaker; and 106, a setting button which triggers a start of the communication parameter setting. The control unit 102 starts a communication parameter setting operation (to be described later) by detecting a user operation of the setting button 106. Reference numeral 107 denotes an antenna control unit; and 108, an antenna.

Figure 13:
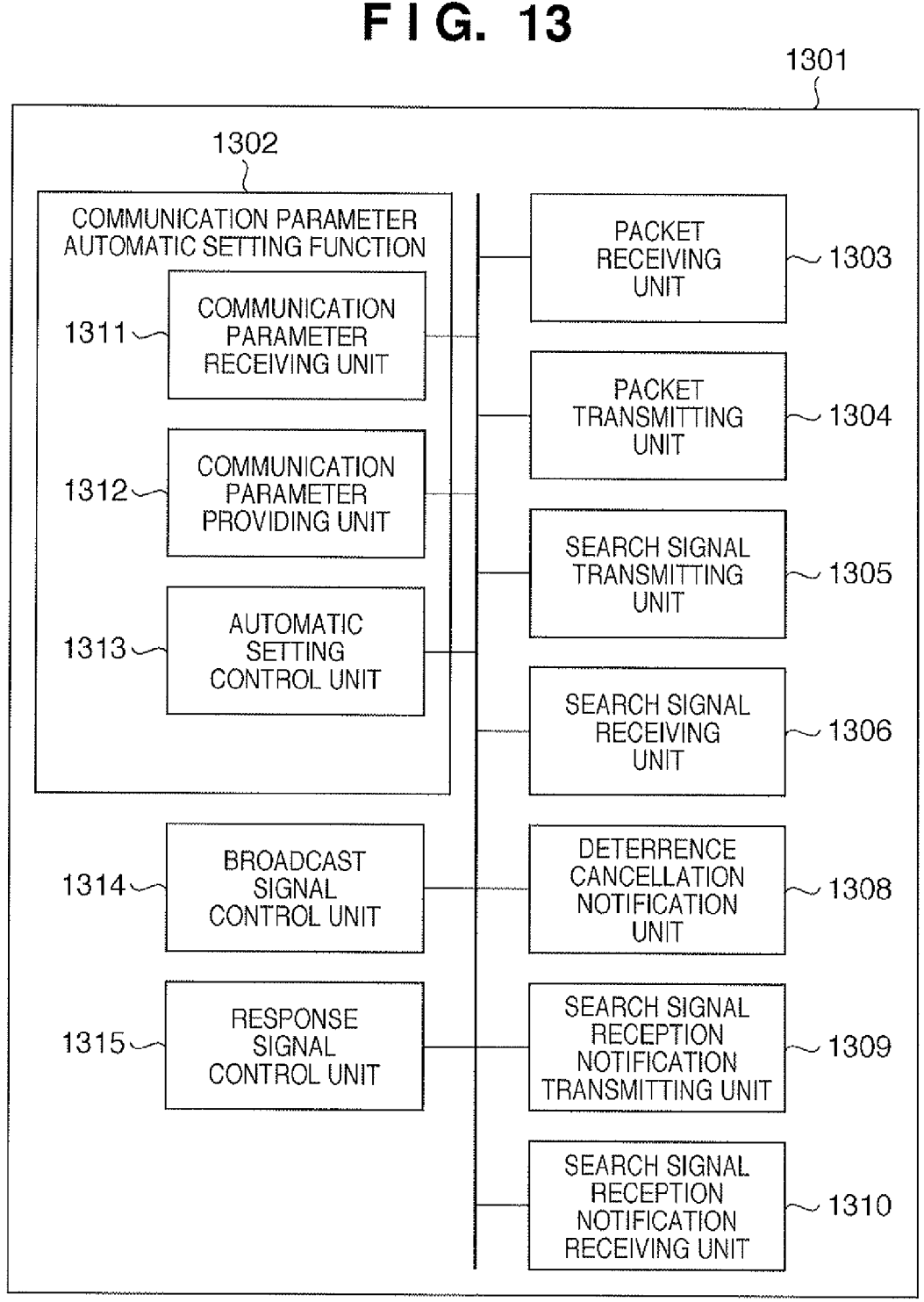
FIG. 13 is a block diagram showing software functional blocks within the terminal according to the embodiments of the present invention.

FIG. 13 is a block diagram showing a configuration of software functional blocks executed by each terminal (to be described later) according to this embodiment.

Reference numeral 1301 denotes a terminal as a whole; and 1302, a communication parameter automatic setting functional block. In this embodiment, communication parameters necessary for wireless communication, such as an SSID as a network identifier, an encryption method, an encryption key, an authentication method, and an authentication key are automatically set. Reference numeral 1303 denotes a packet receiving unit which receives packets associated with various communications; 1304, a packet transmitting unit which transmits packets associated with various communications; and 1305, a search signal transmitting unit which controls transmission of apparatus search signals such as a Probe_Request signal. The search signal transmitting unit 1305 executes transmission processing of a Probe_Request signal (to be described later). Reference numeral 1306 denotes a search signal receiving unit which controls reception of apparatus search signals such as a Probe_Request signal from another terminal. The search signal receiving unit 1306 executes reception processing of a Probe_Response signal (to be described later). The Probe_Response signal is a response signal to the Probe_Request signal, and various pieces of information (self-information) on an apparatus that transmitted the Probe_Response signal are added to the Probe_Response signal.

Reference numeral 1308 denotes a suppression cancellation notification unit which controls transmission of a suppression cancellation notification of beacon/Probe_Response signal transmission. The suppression cancellation notification unit 1308 makes notification of suppression cancellation (to be described later). Reference numeral 1309 denotes a search signal reception notification transmitting unit which transmits a search signal reception notification signal for notifying that an apparatus search signal such as the Probe_Request signal has been received. The search signal reception notification transmitting unit 1309 executes transmission processing of a Probe_Request signal reception notification (to be described later). Reference numeral 1310 denotes a search signal reception notification receiving unit which receives the search signal reception notification. The search signal reception notification receiving unit 1310 executes reception processing of a Probe_Request signal reception notification (to be described later).

Reference numeral 1314 denotes a broadcast signal control unit which executes transmission control, for example, increasing and decreasing the transmission frequency of a broadcast signal such as a beacon signal, suppressing transmission of the broadcast signal, and canceling the suppression. The beacon signal is a broadcast signal for broadcasting various pieces of information pertaining to a network. The broadcast signal control unit 1314 executes beacon signal transmission suppression (broadcast signal suppression) (to be described later), and an operation (to be described later) of changing the value of a beacon interval or the size of a beacon contention window (changing the transmission interval of the broadcast signal). Reference numeral 1315 denotes a response signal control unit which executes transmission control, for example, increasing and decreasing the transmission frequency of a response signal such as the Probe_Response signal, suppressing transmission of the response signal, and canceling the suppression, similarly to the broadcast signal. The response signal control unit 1315 executes Probe_Response signal transmission suppression (response signal suppression) (to be described later).

In the communication parameter automatic setting functional block, reference numeral 1311 denotes a communication parameter receiving unit which receives communication parameters transmitted from a provider of communication parameters; 1312, a communication parameter providing unit which provides a partner apparatus with the communication parameters when the self-apparatus functions as the provider of the communication parameters; and 1313, an automatic setting control unit which controls various protocols in communication parameter automatic setting. The communication parameter receiving unit 1311 and the communication parameter providing unit 1312 execute a communication parameter automatic setting process (to be described later) under the control of the automatic setting control unit 1313.

All the functional blocks are correlated with each other in a software or hardware manner. The above functional blocks are merely examples. A plurality of functional blocks may constitute one functional block, or any one of the functional blocks may be divided into a plurality of blocks each executing a function.

Figure 2:
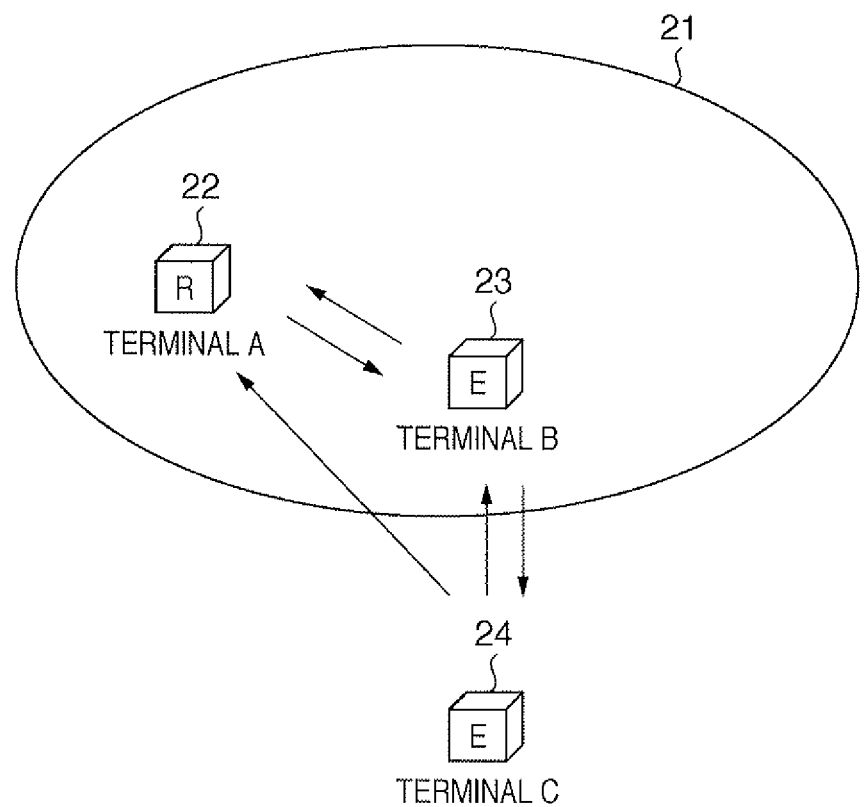
FIG. 2 is a view showing the configuration of an ad-hoc network including three terminals according to the embodiments of the present invention.

FIG. 2 is a view showing a terminal A 22, terminal B 23, and terminal C 24, and an ad-hoc network 21 including the terminal A 22 and terminal B 23.

Each terminal has an IEEE802.11 wireless LAN communication function, wirelessly communicates using wireless LAN ad-hoc communication (to be referred to as ad-hoc communication hereinafter) and has the configurations shown in FIGS. 1 and 13 described above.

Referring to FIG. 2, assume that communication parameter automatic setting has already been executed between the terminal A 22 (to be referred to as terminal A hereinafter) and the terminal B 23 (to be referred to as terminal B hereinafter) at first, terminal A serves as a communication parameter provider, and terminal B serves as a communication parameter acceptor.

Consider a case in which the terminal C 24 (to be referred to as terminal C hereinafter) serving as a new communication parameter acceptor participates in the network 21 which has been built with communication parameter automatic setting.

Figure 12:
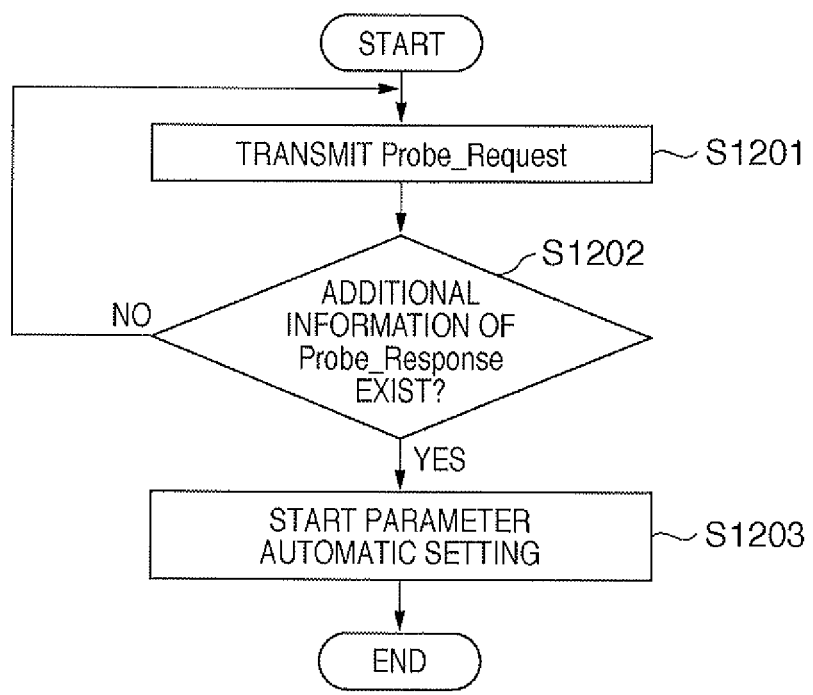
FIG. 12 is a flowchart showing the operation of terminal C according to the embodiments of the present invention.

FIG. 12 is a flowchart showing the operation of terminal C in searching for a communication parameter provider. Terminal C transmits a Probe_Request signal to which additional information representing communication parameter automatic setting is added, in order to search for a communication parameter provider (S1201). Terminal C waits for a Probe_Response signal to be returned, to which additional information representing a provider in communication parameter automatic setting is added (S1202). If a Probe_Response signal is not returned after a predetermined period of time or the additional information representing a provider has not been added to a returned Probe_Response signal, terminal C repeats transmission of the Probe_Request signal (S1201). Thereafter, terminal C repeats the same operation until a provider in communication parameter setting is found.

If the additional information representing a provider has been added to the returned Probe_Response signal, terminal C determines that the terminal which returned the Probe_Response signal is the provider. Terminal C requests the provider to provide communication parameters, starts a communication parameter automatic setting process with the provider (terminal A), and receives the communication parameters from the provider (S1203).

Figure 6:
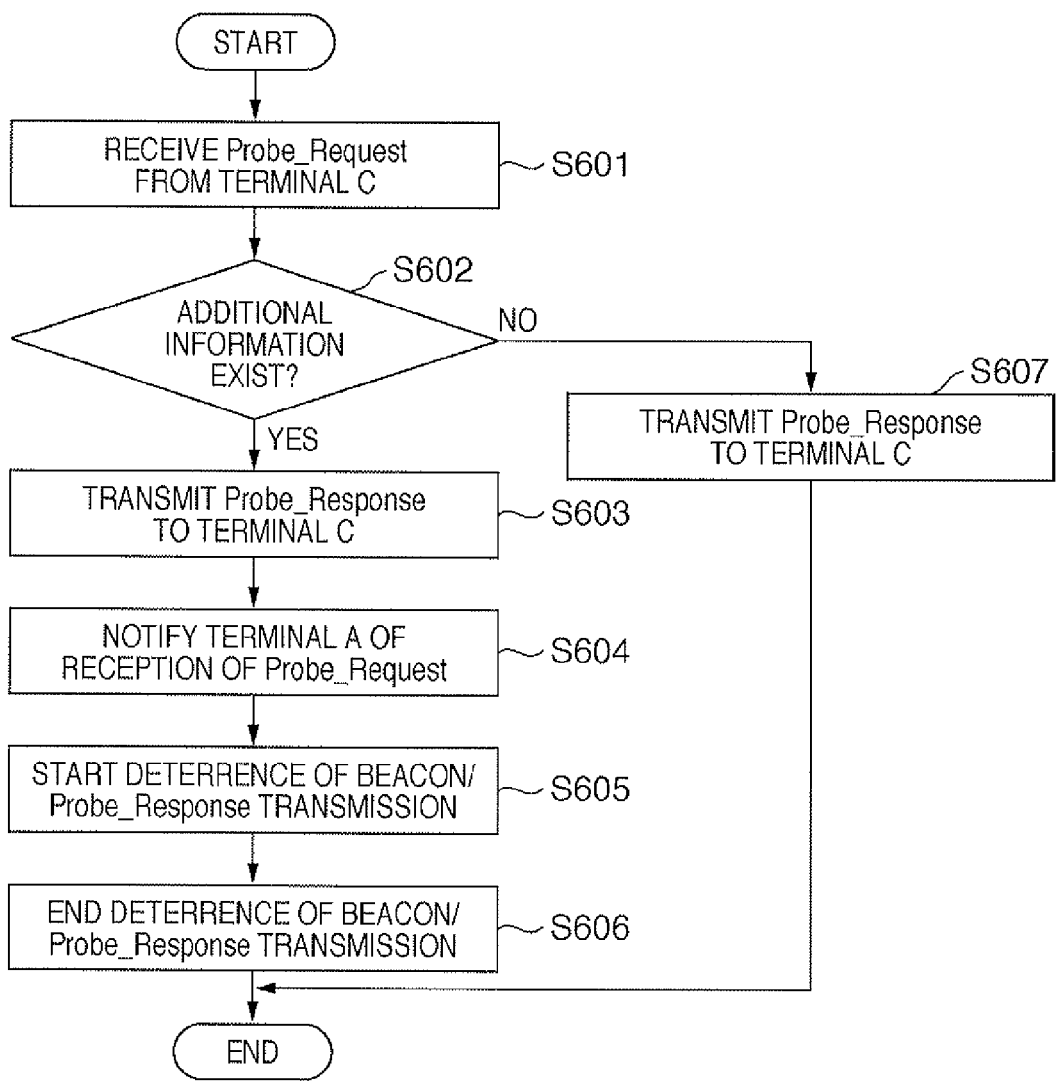
FIG. 6 is a flowchart showing the operation of terminal B according to the first embodiment.

FIG. 6 is a flowchart showing the operation of terminal B.

Terminal B receives a Probe_Request signal from terminal C (S601). If it is terminal B's turn to respond to the Probe_Request signal, terminal B prepares to send a Probe_Response signal at this time.

That is, if terminal B is a station which transmitted a beacon signal last before the Probe_Request was transmitted, terminal B prepares to send a Probe_Response signal.

Terminal B determines whether additional information representing communication parameter automatic setting has been added to the received Probe_Request signal (S602). If the additional information does not exist, terminal B executes no processing, returns an ordinary Probe_Response signal to terminal C which has transmitted the Probe_Request signal (S607), and ends the process.

If the additional information has been added (S602), terminal B returns a Probe_Response signal to terminal C (S603). Note that since terminal B completes the communication parameter automatic process, terminal B does not add additional information to the Probe_Response signal.

Terminal B transmits a Probe_Request signal reception notification to terminal A serving as the communication parameter provider in the communication parameter automatic setting process to notify terminal A that terminal B has received the Probe_Request signal (S604). After transmitting the reception notification, terminal B suppresses beacon signal transmission and Probe_Response signal transmission (S605).

When a predetermined period of time elapses after terminal B suppresses beacon signal transmission and Probe_Response signal transmission, or when terminal B receives a beacon signal from terminal A, terminal B cancels the suppression of the beacon signal transmission and Probe_Response signal transmission (S606).

In step S605, terminal B may extend the beacon interval or contention window instead of suppressing the beacon signal transmission and Probe_Response signal transmission. This makes it possible to reduce the possibility that it becomes terminal B's turn to respond to the Probe_Request signal. In this case, terminal B returns the value of the beacon interval or the size of the contention window to the original value or size instead of canceling the transmission suppression in step S606. Similarly, other methods may be used to make it difficult for terminal B to respond to the Probe_Request signal from terminal C.

Figure 7:
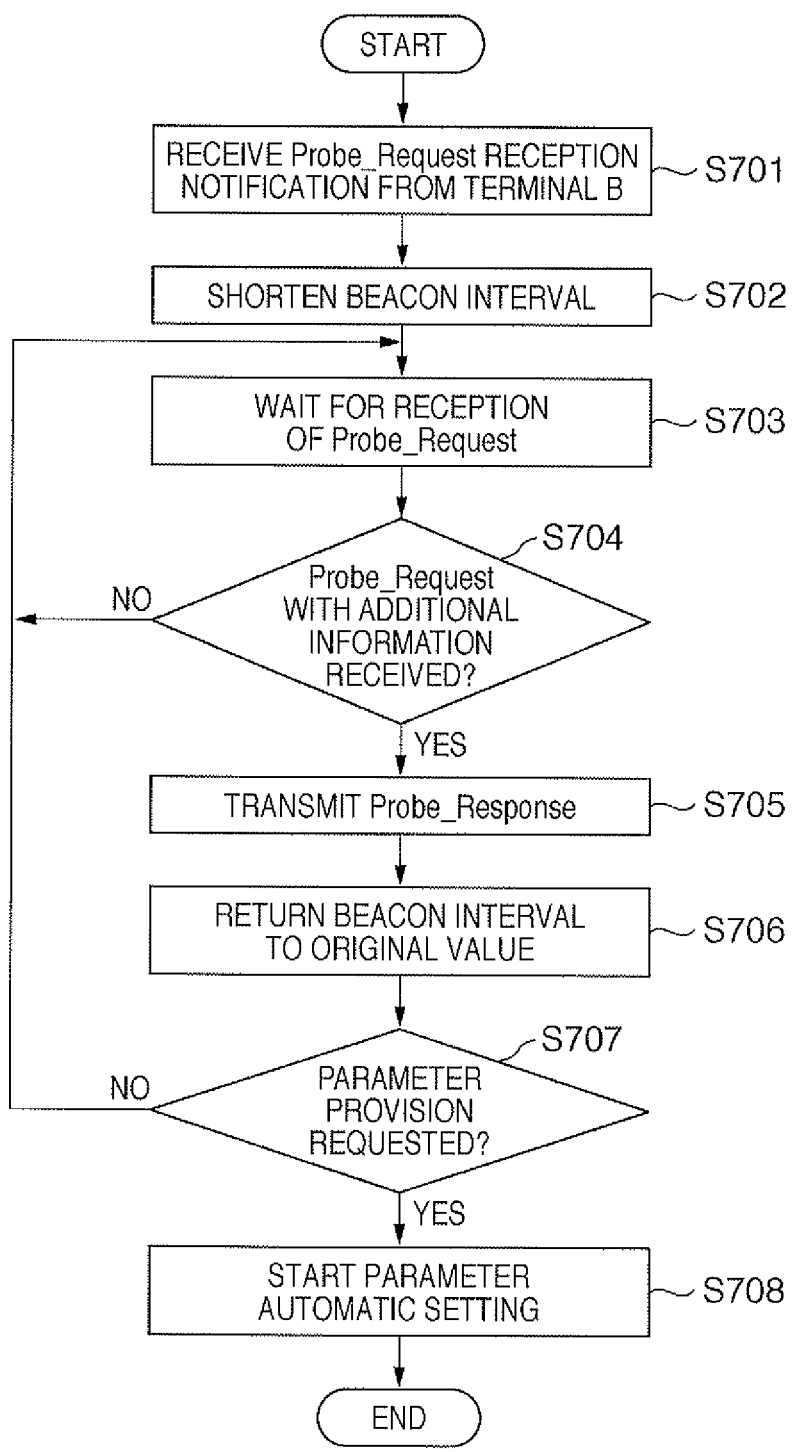
FIG. 7 is a flowchart showing the operation of terminal A according to the first embodiment.

FIG. 7 is a flowchart showing the operation of terminal A.

Upon reception of a Probe_Request signal reception notification from terminal B, terminal A detects the reception notification (S701). By receiving the reception notification, terminal A knows that there exists a terminal on the network, which is searching for terminal A. Terminal A therefore shortens the beacon interval (S702) to make it easier to detect terminal A. That is, terminal A increases an opportunity of transmitting the beacon signal by shortening the beacon interval so as to become a terminal which responds to a Probe_Request signal. Terminal A continues to wait for reception of a Probe_Request signal (S703). Upon reception of a Probe_Request signal, terminal A determines whether additional information representing communication parameter automatic setting has been added to the received Probe_Request signal (S704).

If the additional information has not been added, the Probe_Request signal is not from a terminal which is searching for terminal A. Thus terminal A returns to a state in which it waits for reception of a Probe_Request signal. On the other hand, if the additional information has been added, terminal A transmits a Probe_Response signal (S705). Since terminal A can notify terminal C of the existence of itself by transmitting the Probe_Response signal, terminal A returns the value of the beacon interval to the original value (S706). The control of the beacon interval of terminal A has been described above. However, to make it easier for terminal C to detect terminal A, terminal A may, for example, reduce the contention window instead of shortening the beacon interval. Other methods are available as long as they make it easier for terminal C to detect terminal A.

If terminal C requests terminal A to provide the communication parameters within a predetermined period of time (S707), terminal A starts a communication parameter automatic setting process with terminal C, and provides terminal C with the communication parameters (S708). If terminal C does not request terminal A to provide the communication parameters within the predetermined period of time in step S707, the process returns to step S703 and terminal A waits for reception of a Probe_Request signal.

Figure 3:
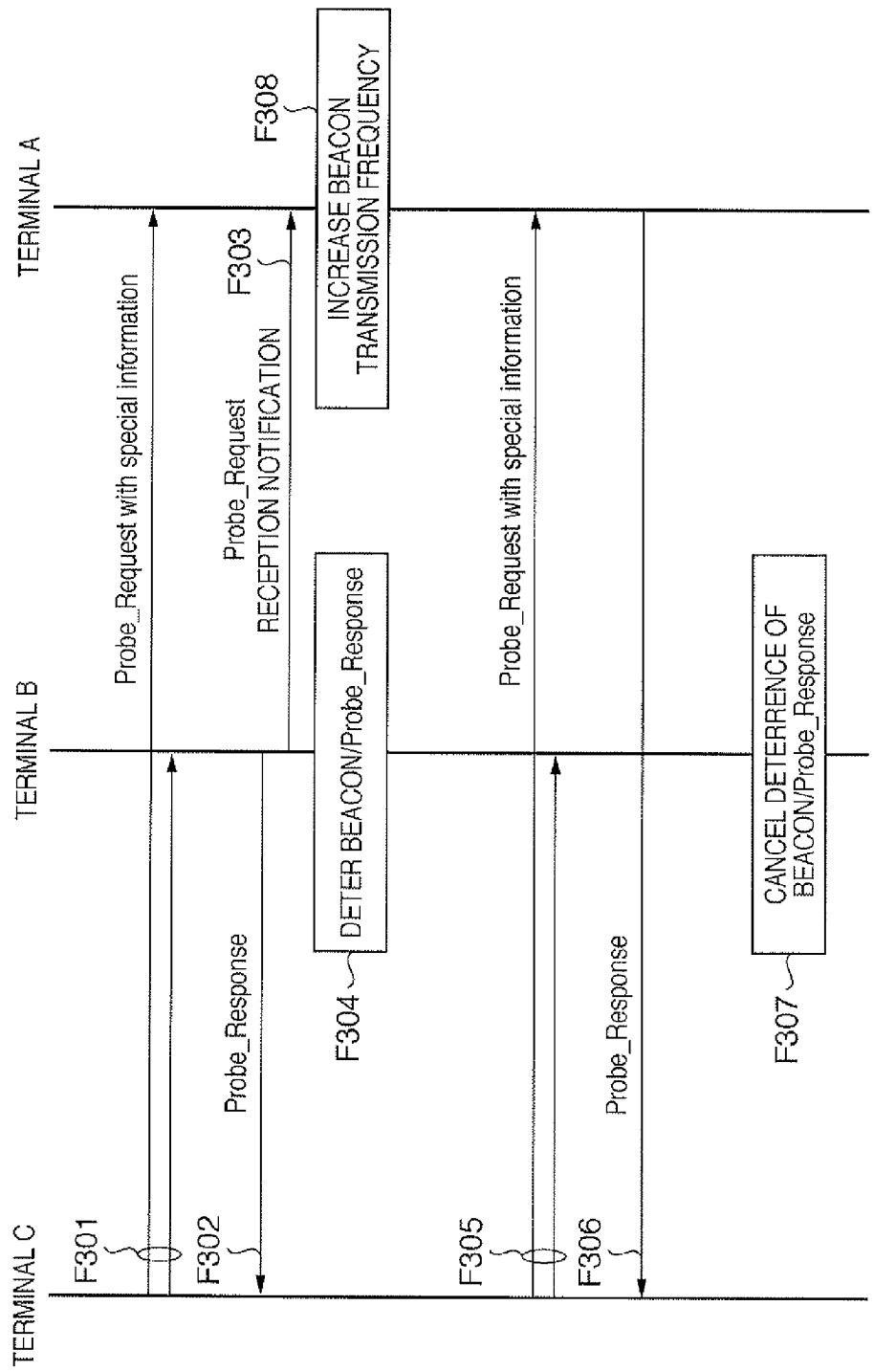
FIG. 3 is a sequence chart showing the operation of terminal A, terminal B, and terminal C according to the first embodiment.

FIG. 3 is a sequence chart when terminal C searches the network 21 for a provider in communication parameter automatic setting.

To search for a communication parameter provider, terminal C broadcasts, to the network 21, a Probe_Request signal to which an identifier representing that terminal C has a communication parameter automatic setting function is added (F301).

In the IEEE802.11 ad-hoc network, a terminal which has sent a beacon signal last returns a Probe_Response signal as a response to the Probe_Request signal, as described above. Therefore, depending on timing, in place of terminal A serving as the communication parameter provider, terminal B serving as a communication parameter acceptor may return a response as shown in FIG. 3 (F302).

Terminal B which has returned a Probe_Response signal transmits a Probe_Request signal reception notification to terminal A which should actually return a response to terminal C (F303).

Terminal B suppresses transmission of its beacon signal and a Probe_Response signal while transmitting the Probe_Request signal reception notification (F304). Upon reception of the Probe_Request signal reception notification, terminal A increases the beacon signal transmission frequency by shortening the beacon interval so as to become a transmitting station of a Probe_Response signal (F308).

Since terminal C receives the Probe_Response signal from terminal B, it cannot determine a communication parameter provider. Terminal C therefore broadcasts the Probe_Request signal to the network 21 again (F305).

At this time, since the beacon/Probe_Response signal transmission function of terminal B is suppressed, terminal A returns a Probe_Response signal to terminal C (F306).

When terminal A returns the Probe_Response signal to terminal C, or when a predetermined timer expires, the suppression of the Probe_Response signal transmission function of terminal B is canceled (F307).

In this embodiment, the value of the beacon interval or the size of the beacon contention window of terminal A is returned to the original value or size when terminal A transmits the Probe_Response signal in step S705. However, upon start of the communication parameter automatic setting process between terminal A and terminal C, which is executed after the transmission of the Probe_Response signal, the value of the beacon interval or the size of the beacon contention window may be returned to the original value or size.

Similarly, the start of the communication parameter automatic setting process between terminal A and terminal C may be used as a trigger for canceling the suppression of the Probe_Response signal transmission function of terminal B.

<Second Embodiment>

The hardware and software configurations in the second embodiment are shown in FIGS. 1 and 13, respectively, similarly to the first embodiment. A network configuration in the second embodiment is shown in FIG. 2, similarly to the first embodiment.

A flowchart showing the operation of terminal C according to this embodiment is the same as that in the first embodiment (FIG. 12).

Figure 8:
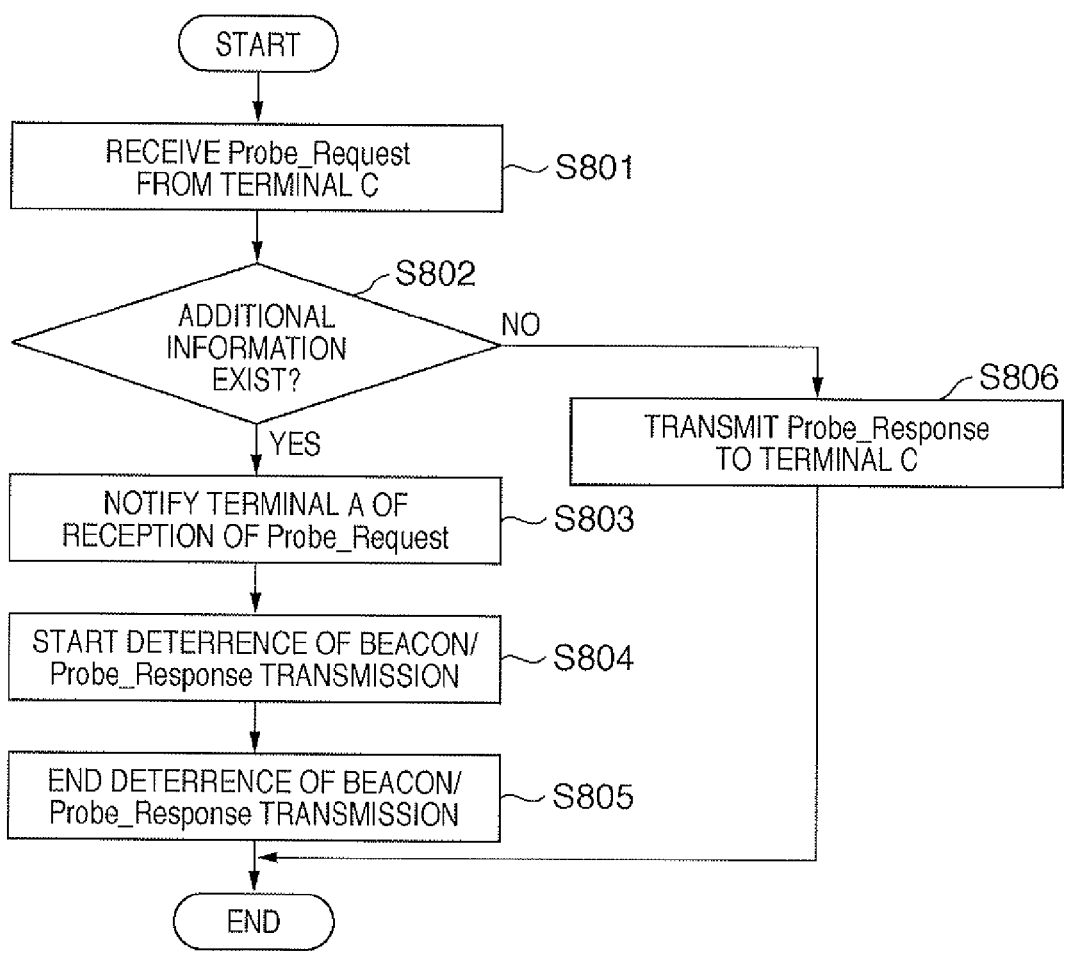
FIG. 8 is a flowchart showing the operation of terminal B according to the second embodiment.

FIG. 8 is a flowchart showing the operation of terminal B according to this embodiment.

Terminal B receives a Probe_Request signal from terminal C (S801). If it is terminal B's1 turn to respond to the Probe_Request signal, terminal B prepares to send a Probe_Response signal at this time. Terminal B determines whether additional information representing communication parameter automatic setting has been added to the Probe_Request signal (S802). If the additional information does not exist, terminal B executes no processing, returns an ordinary Probe_Response signal to terminal C (S806), and ends the process.

On the other hand, if the additional information has been added, terminal B notifies terminal A serving as a communication parameter provider in a communication parameter automatic setting process of a Probe_Request signal reception notification representing that terminal B has received the Probe_Request signal (S803). After transmitting the reception notification, terminal B suppresses beacon signal transmission and Probe_Response signal transmission (S804).

When a predetermined period of time elapses after terminal B suppresses the beacon signal transmission and Probe_Response signal transmission, or when terminal B receives a beacon signal from terminal A, terminal B cancels the suppression of the beacon signal transmission and Probe_Response signal transmission (5805).

In step S804, terminal B may extend a beacon interval or contention window instead of suppressing the beacon signal transmission and Probe_Response signal transmission. This makes it possible to reduce the possibility that it becomes terminal B's turn to respond to the Probe_Request signal. In this case, terminal B returns the value of the beacon interval or the size of the contention window to the original value or size instead of canceling the transmission suppression in step S805. Similarly, other methods may be used to make it difficult for terminal B to respond to the Probe_Request signal from terminal C.

Figure 9:
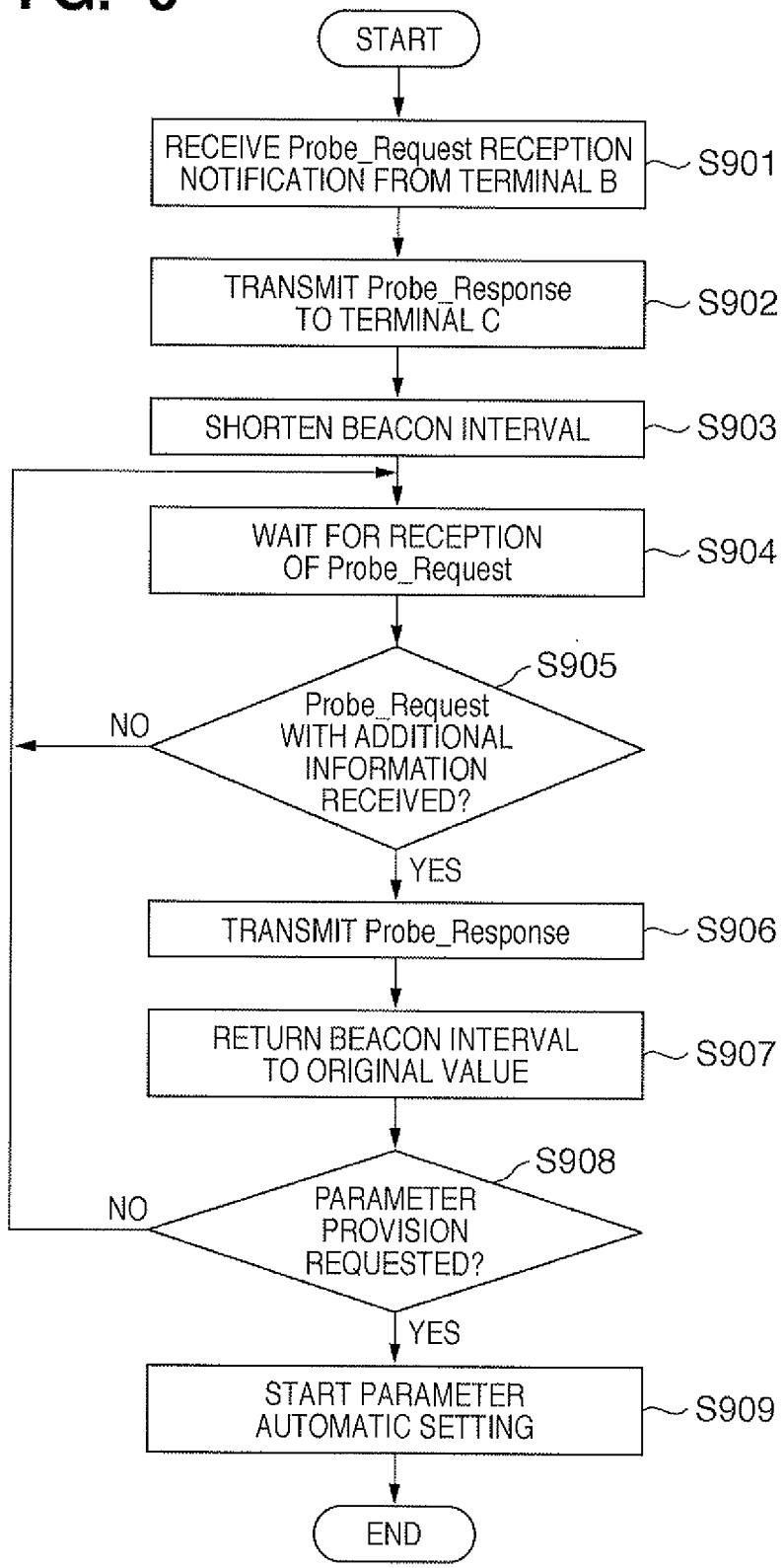
FIG. 9 is a flowchart showing the operation of terminal A according to the second embodiment.

FIG. 9 is a flowchart showing the operation of terminal A according to this embodiment.

Upon reception of a Probe_Request signal reception notification from terminal B, terminal A detects the reception notification (S901). By receiving the reception notification, terminal A knows that there exists a terminal on a network, which is searching for terminal A. Terminal A therefore transmits a Probe_Response signal to notify that it exists (S902). Since terminal C may not interpret the Probe_Response signal, terminal A shortens the beacon interval (S903) to make it easier for terminal A to be detected. That is, terminal A increases its opportunity to transmit the beacon signal by shortening the beacon interval so as to become a terminal which responds to a Probe_Request signal. Terminal A continues to wait for reception of a Probe_Request signal (S904). Upon reception of a Probe_Request signal, terminal A determines whether additional information representing communication parameter automatic setting has been added to the received Probe_Request signal (S905).

If the additional information has not been added, the Probe_Request signal is not from a terminal which is searching for terminal A. Thus terminal A returns to a state in which it waits for reception of a Probe_Request signal. On the other hand, if the additional information has been added, terminal A transmits a Probe_Response signal (S906). Since terminal A can notify terminal C of the existence of itself when terminal A transmits the Probe_Response signal, terminal A returns the value of the beacon interval to the original value (S907). The control of the beacon interval of terminal A has been described above. However, to make it easier for terminal C to detect terminal A, terminal A may, for example, reduce the contention window instead of shortening the beacon interval. Other methods are available as long as they make it easier for terminal C to detect terminal A.

If terminal C requests terminal A to provide communication parameters within a predetermined period of time (S908), terminal A starts a communication parameter automatic setting process with terminal C, and provides terminal C with the communication parameters (S909). If terminal C does not request terminal A to provide the communication parameters within the predetermined period of time in step S908, the process returns to step S904 and terminal A waits for reception of a Probe_Request signal.

Figure 4:
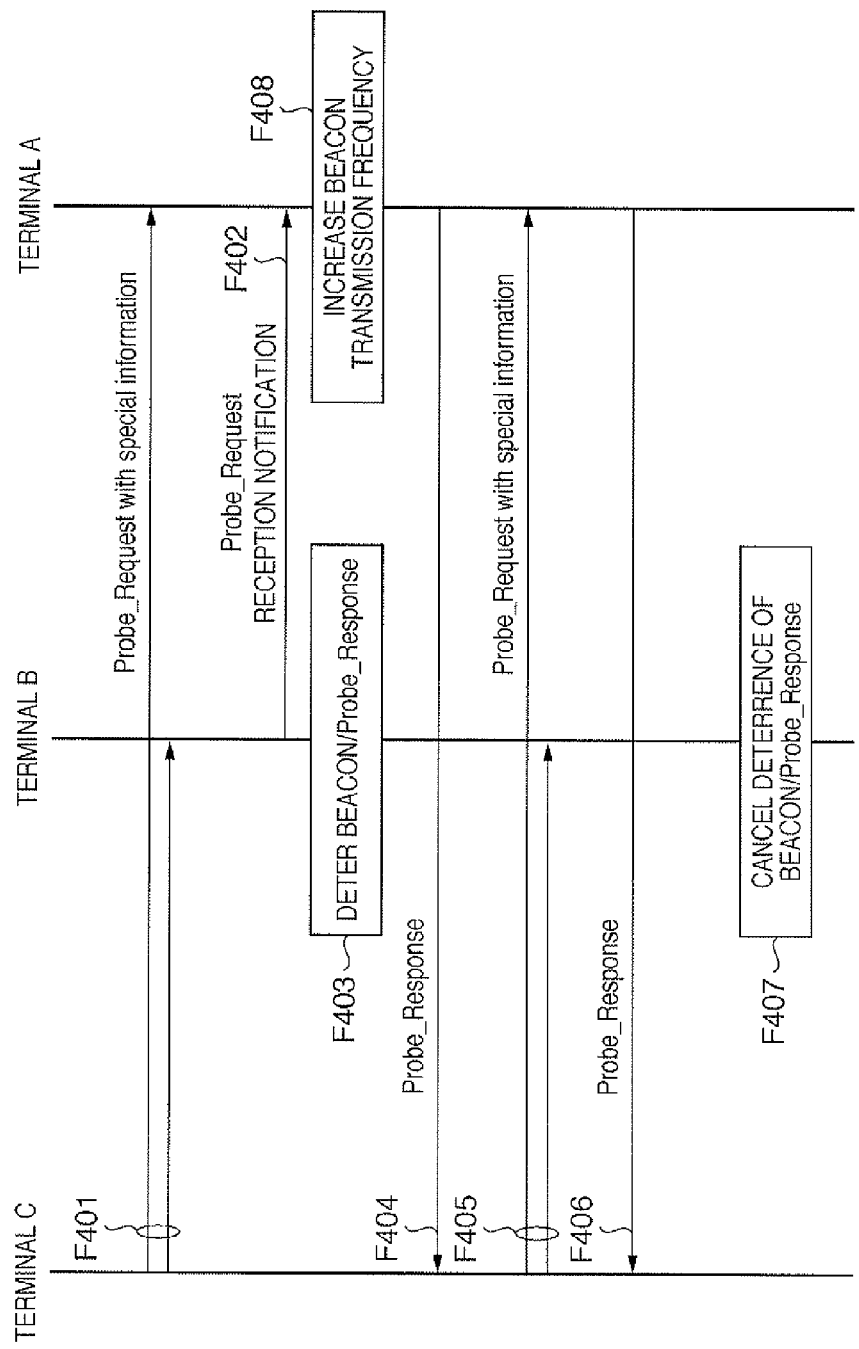
FIG. 4 is a sequence chart showing the operation of terminal A, terminal B, and terminal C according to the second embodiment.

FIG. 4 is a sequence chart when terminal C searches a network 21 for a provider in the communication parameter automatic setting.

To search for a communication parameter provider, terminal C broadcasts a Probe_Request signal to the network 21 (F401).

In the IEEE802.11 ad-hoc network, a terminal which has sent a beacon signal last returns a Probe_Response signal as a response to the Probe_Request signal, as described above. Therefore, depending on timing, in place of terminal A serving as the communication parameter provider, terminal B serving as a communication parameter acceptor may be in its turn to return a response as shown in FIG. 4. In this embodiment, however, terminal B does not transmit a Probe_Response signal but transmits a Probe_Request signal reception notification to terminal A which should actually return a response to terminal C (F402).

Upon transmission of the Probe_Request signal reception notification, terminal B suppresses transmission of its beacon signal and a Probe_Response signal (F403). Upon reception of the Probe_Request signal reception notification, terminal A increases the beacon signal transmission frequency by shortening the beacon interval so as to become a transmitting station of a Probe_Response signal (F408).

Terminal A transmits a Probe_Response signal to terminal C by using the reception of the Probe_Request signal from terminal C and the reception of the Probe_Request signal reception notification from terminal B as a trigger (F404). The Probe_Response signal is transmitted regardless of the Probe_Response signal transmission order in the IEEE802.11 ad-hoc network.

Terminal C broadcasts the Probe_Request signal to the network 21 again (F405).

At this time, since the Probe_Response signal transmission function of terminal B is suppressed, terminal A returns a Probe_Response signal to terminal C (F406).

When terminal A returns the Probe_Response signal to terminal C, or when a predetermined timer expires, the suppression of the Probe_Response signal transmission function of terminal B is canceled (F407).

In this embodiment, terminal A transmits the Probe_Response signal in step S906 when the value of the beacon interval or the size of the beacon contention window of terminal A is returned to the original value or size. However, upon start of the communication parameter automatic setting process between terminal A and terminal C, which is executed after the transmission of the Probe_Response signal, the value of the beacon interval or the size of the beacon contention window may be returned to the original value or size.

Similarly, the start of the communication parameter automatic setting process between terminal A and terminal C may be used as a trigger for canceling the suppression of the Probe_Response signal transmission function of terminal B.

<Third Embodiment>

The hardware and software configurations in the third embodiment are shown in FIGS. 1 and 13, respectively, similarly to the first embodiment. A network configuration in the third embodiment is shown in FIG. 2, similarly to the first and second embodiments.

A flowchart showing the operation of terminal C according to this embodiment is the same as that in the first embodiment (FIG. 12).

Figure 10:
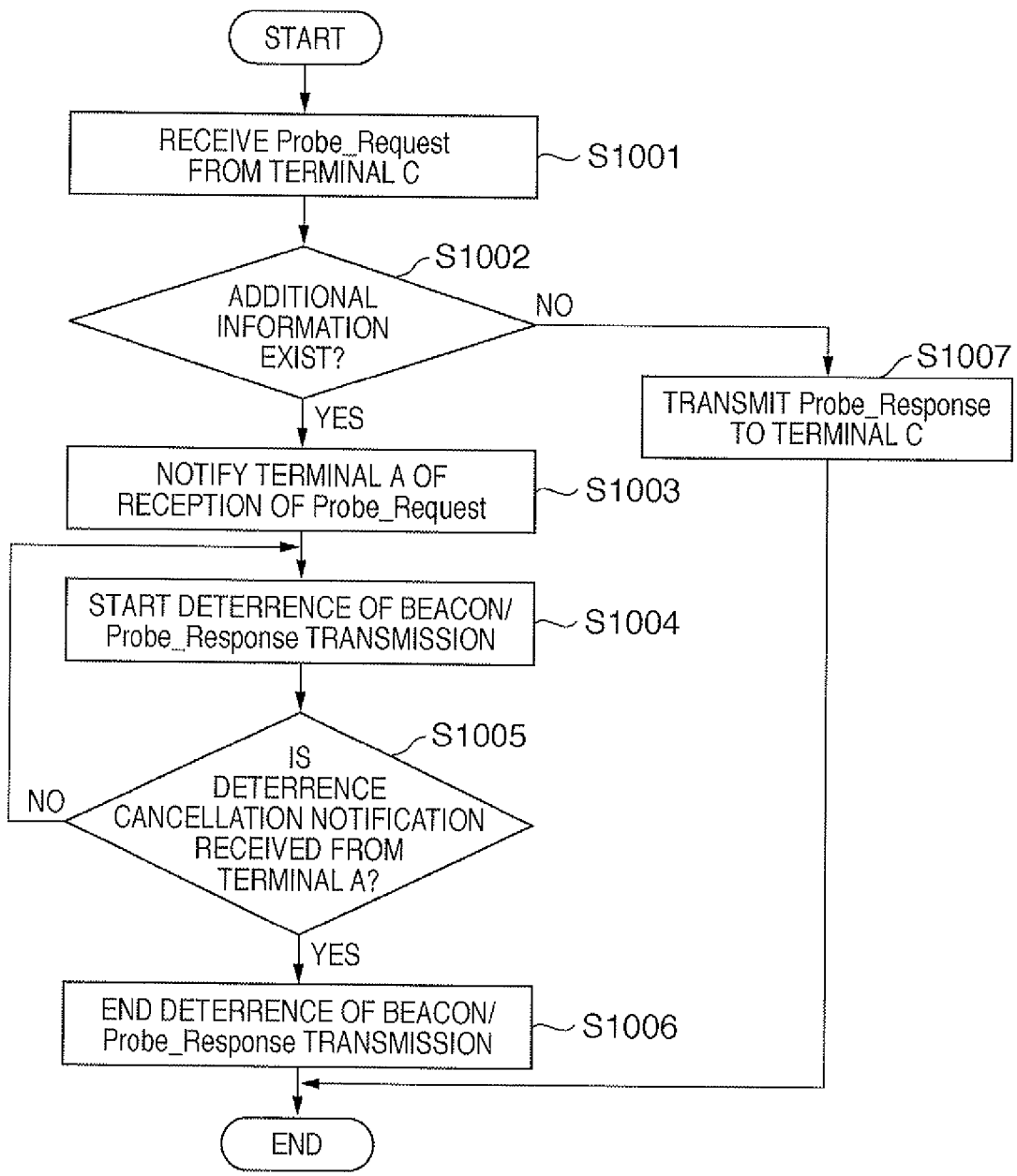
FIG. 10 is a flowchart showing the operation of terminal B according to the third embodiment.

FIG. 10 is a flowchart showing the operation of terminal B according to this embodiment.

Terminal B receives a Probe_Request signal from terminal C (S1001). If it is terminal B's turn to respond to the Probe_Request signal, terminal B prepares to send a Probe_Response signal at this time. Terminal B determines whether additional information representing communication parameter automatic setting has been added to the Probe_Request signal (S1002). If the additional information does not exist, terminal B executes no processing, returns an ordinary Probe_Response signal to terminal C (S1007), and ends the process.

On the other hand, if the additional information has been added, terminal B notifies terminal A serving as a communication parameter provider in a communication parameter automatic setting process of a Probe_Request signal reception notification representing that terminal B has received the Probe_Request signal (S1003). After transmitting the reception notification, terminal B suppresses beacon signal transmission and Probe_Response signal transmission (S1004).

Upon reception of a suppression cancellation notification from terminal A (S1005), terminal B cancels the suppression of the beacon signal transmission and Probe_Response signal transmission (S1006). If terminal B does not receive a suppression cancellation notification (S1005), terminal B continues the suppression of the beacon signal transmission and Probe_Response signal transmission.

Terminal B may extend a beacon interval or contention window instead of suppressing the beacon signal transmission and Probe_Response signal transmission. This makes it possible to reduce the possibility that it becomes terminal B's turn to respond to the Probe_Request signal. In this case, terminal B returns the value of the beacon interval or the size of the contention window to the original value or size instead of canceling the transmission suppression in step S1006. Similarly, other methods may be used to make it difficult for terminal B to respond to the Probe_Request signal from terminal C.

Figure 11:
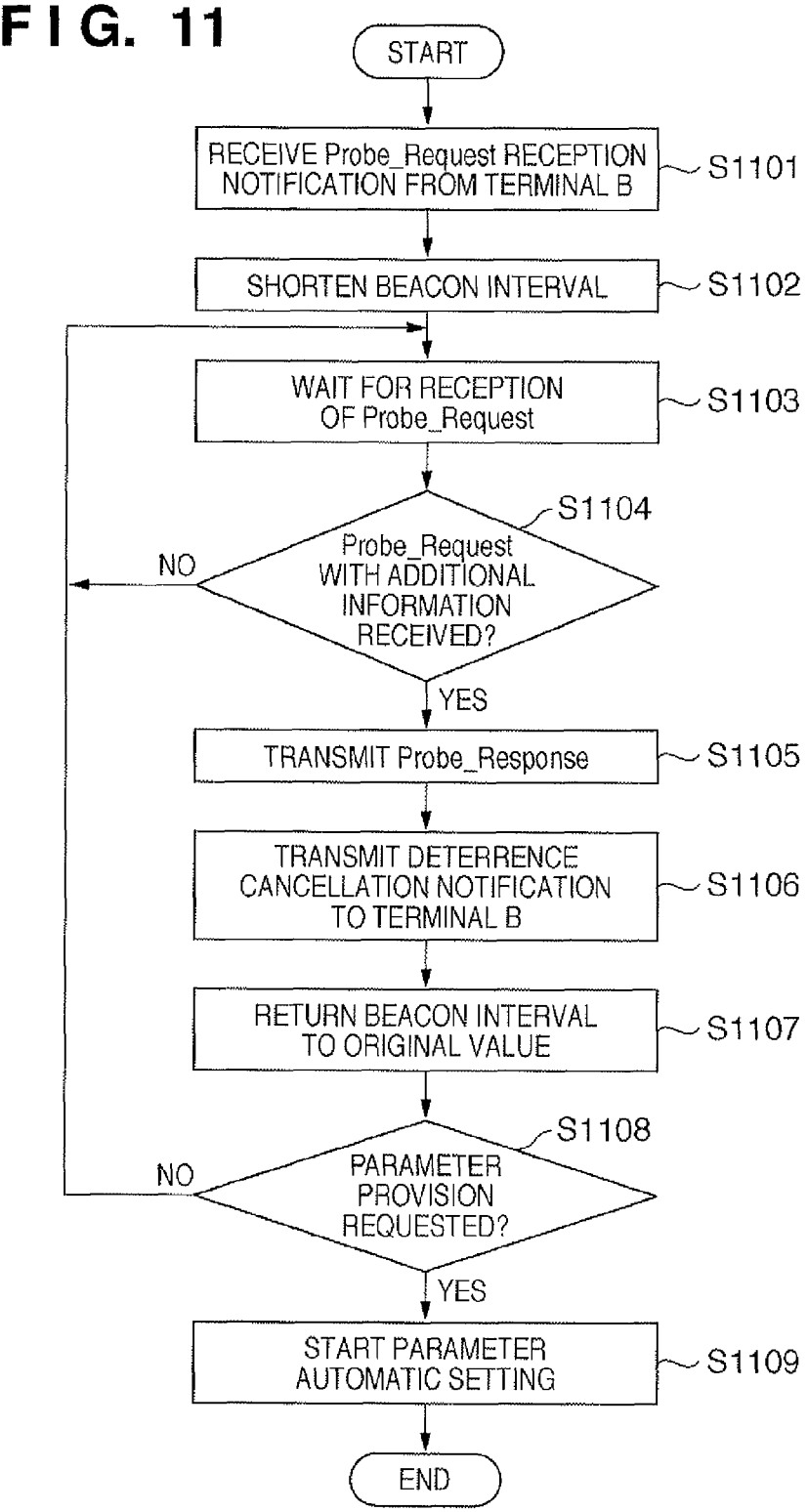
FIG. 11 is a flowchart showing the operation of terminal A according to the third embodiment.

FIG. 11 is a flowchart showing the operation of terminal A according to this embodiment.

Upon reception of a Probe_Request signal reception notification from terminal B, terminal A detects the reception notification (S1101). By receiving the reception notification, terminal A knows that there exists a terminal on a network, which is searching for terminal A. Terminal A therefore shortens the beacon interval (S1102) to make it easier to detect terminal A. That is, terminal A increases its opportunity to transmit the beacon signal by shortening the beacon interval so as to become a terminal which responds to a Probe_Request signal. Terminal A continues to wait for reception of a Probe_Request signal (S1103). Upon reception of a Probe_Request signal, terminal A determines whether additional information representing communication parameter automatic setting has been added to the received Probe_Request signal (S1104).

If the additional information has not been added, the Probe_Request signal is not from a terminal which is searching for terminal A. Thus terminal A returns to a state in which it waits for reception of a Probe_Request signal. On the other hand, if the additional information has been added, terminal A transmits a Probe_Response signal (S1105). Since terminal A can notify terminal C of its existence when terminal A transmits the Probe_Response signal, terminal A transmits a suppression cancellation notification to terminal B (S1106). That is, terminal B suppresses the beacon signal transmission and Probe_Response signal transmission for terminal A. Terminal A transmits a suppression cancellation notification to terminal B to cause it to cancel the suppression of the beacon signal transmission and Probe_Response signal transmission.

Upon transmission of the suppression cancellation notification, terminal A returns the value of the beacon interval to the original value (S1107). The control of the beacon interval of terminal A has been described above. However, to make it easier for terminal C to detect terminal A, terminal A may reduce the contention window instead of shortening the beacon interval. Other methods are available as long as they make it easier for terminal C to detect terminal A.

If terminal C requests terminal A to provide communication parameters within a predetermined period of time (S1108), terminal A starts a communication parameter automatic setting process with terminal C, and provides terminal C with the communication parameters (S1109). If terminal C does not request terminal A to provide the communication parameters within the predetermined period of time in step S1108, the process returns to step S1103 and terminal A waits for reception of a Probe_Request signal.

Figure 5:
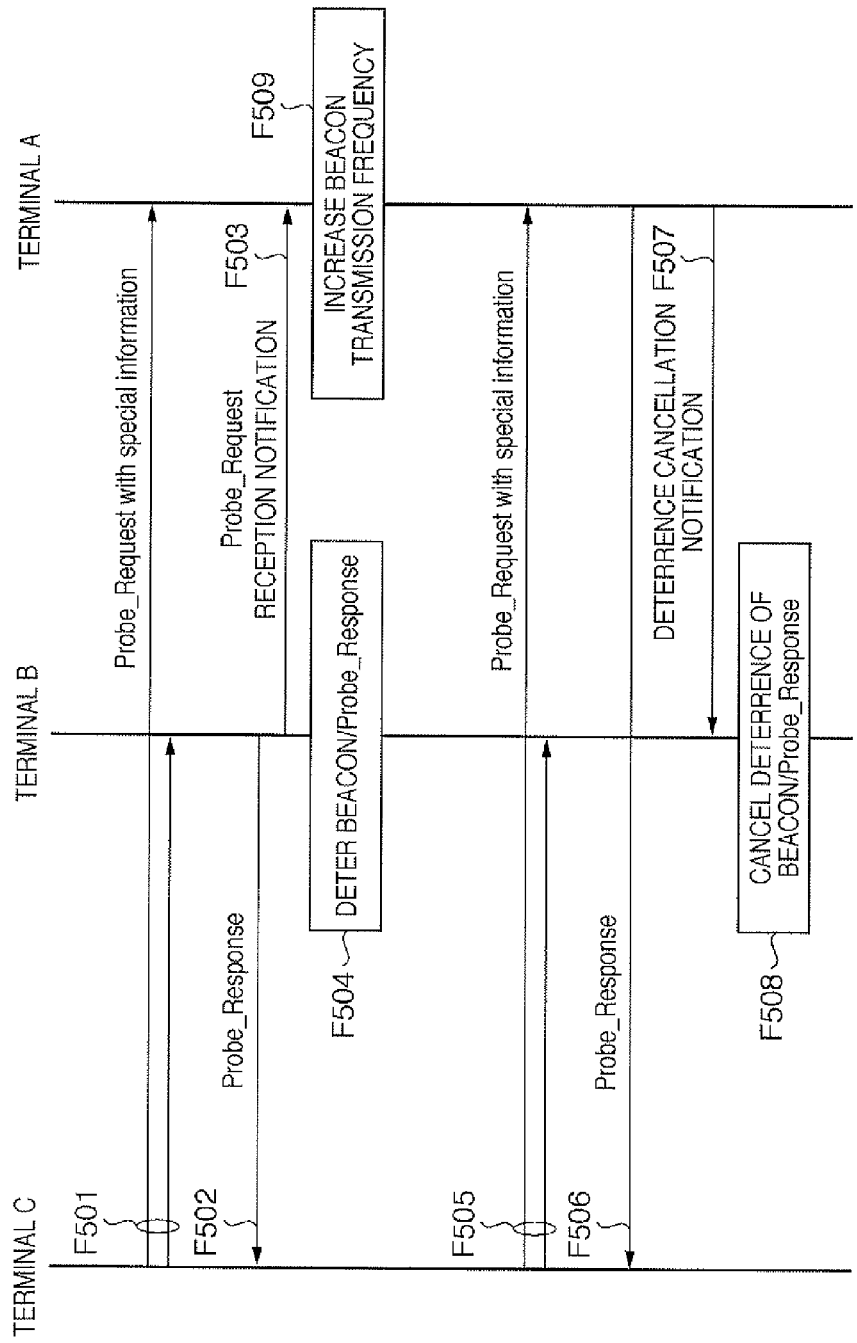
FIG. 5 is a sequence chart showing the operation of terminal A, terminal B, and terminal C according to the third embodiment.

FIG. 5 is a sequence chart for explaining a process by which terminal C searches a network 21 for a provider in communication parameter automatic setting.

To search for a communication parameter provider, terminal C broadcasts, to the network 21, a Probe_Request signal to which an identifier representing that terminal C has a communication parameter automatic setting function is added (F501).

In IEEE802.11 ad-hoc networks, a terminal which has sent a beacon signal last returns a Probe_Response signal as a response to the Probe_Request signal, as described above. Therefore, depending on timing, in place of terminal A serving as the communication parameter provider, terminal B serving as a communication parameter acceptor may return a response as shown in FIG. 5 (F502).

Terminal B which has returned a Probe_Response signal transmits a Probe_Request signal reception notification to terminal A which should actually return a response to terminal C (F503).

Terminal B suppresses transmission of its beacon signal and a Probe_Response signal while transmitting the Probe_Request signal reception notification (F504). Upon reception of the Probe_Request signal reception notification, terminal A increases the beacon signal transmission frequency by shortening the beacon interval so as to become a transmitting station of a Probe_Response signal (F509).

Since terminal C receives the Probe_Response signal from terminal B, it cannot determine a communication parameter provider. Terminal C therefore broadcasts the Probe_Request signal again (F505).

At this time, since the beacon/Probe_Response signal transmission function of terminal B is suppressed, terminal A returns a Probe_Response signal to terminal C (F506).

Terminal C can recognize the communication parameter provider by receiving the Probe_Response signal from terminal A.

After transmitting the Probe_Response signal and confirming that terminal C has not transmitted a new Probe_Request signal, terminal A transmits a suppression cancellation notification to terminal B (F507).

Terminal B cancels the suppression of the transmission function using the reception of the suppression cancellation notification as a trigger (F508).

If terminal C transmits the Probe_Request signal again before terminal A transmits the suppression cancellation notification, terminal A returns the Probe_Response signal to terminal C, and transmits the suppression cancellation notification to terminal B. Terminal B which has received the suppression cancellation notification cancels the suppression of the transmission function.

In this embodiment, the transmission of the Probe_Response signal in step S1105 is used as a trigger for returning the value of the beacon interval or the size of the beacon contention window of terminal A to the original value or size and transmitting the suppression cancellation notification to terminal B. However, the start of the communication parameter automatic setting process between terminal A and terminal C, which is executed after terminal A transmits the Probe_Response signal may be used as the trigger.

As described above, according to the above embodiments, a communication apparatus which receives new communication parameters can detect a communication parameter provider by a small number of searches.

Even if the apparatuses equally build a network (an ad-hoc network), it is possible to easily detect the communication parameter provider.

Upon reception of a Probe_Request signal reception notification, the provider increases the beacon signal transmission frequency. It is therefore possible to decrease the power consumption in comparison with a case in which the provider always uses an increased beacon signal transmission frequency.

Although the preferred embodiments of the present invention have been described above, they are merely examples for explaining the present invention, and are not intended to limit the scope of the present invention. Various modifications can be made to the embodiments without departing from the spirit and scope of the present invention.

For example, in the above explanation of the embodiments, Probe_Request and Probe_Response signals are used. However, signals to be transmitted are not limited to them, and other signals playing the same roles may be used.

An IEEE802.11 wireless LAN has been explained as an example. The present invention may, however, be implemented in another wireless medium such as wireless USB, MBOA, Bluetooth®, UWB (Ultra Wide Band), or ZigBee. The present invention may also be implemented in a wired communication medium such as a wired LAN.

Note that MBOA is an abbreviation for Multi Band OFDM Alliance. UWB includes wireless USB, wireless 1394, and WINET.

Although a network identifier, encryption method, encryption key, authentication method, and authentication key are used as examples of communication parameters, other information may be used and also included in communication parameters.

In the present invention, a storage medium which stores software program codes for implementing the above-described functions may be supplied to a system or apparatus, and the computer (or the CPU or MPU) of the system or apparatus may read out and execute the program codes stored in the storage medium. In this case, the program codes read out from the storage medium implement the functions of the above-described embodiments, and the storage medium which stores the program codes constitutes the present invention.

The storage medium for supplying the program codes includes a flexible disk, hard disk, optical disk, magnetooptical disk, CD-ROM, CD-R, magnetic tape, nonvolatile memory card, ROM, and DVD.

The above-described functions are implemented when the computer executes the readout program codes. Also, the above-described functions may be implemented when an OS running on the computer performs some or all of actual processes on the basis of the instructions of the program codes. OS is an abbreviation for Operating System.

Furthermore, the above-described functions may be implemented when the program codes read out from the storage medium are written in the memory of a function expansion board inserted into the computer or the memory of a function expansion unit connected to the computer, and the CPU of the function expansion board or function expansion unit performs some or all of actual processes on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-187149, filed Jul. 18, 2007, which is hereby incorporated by reference herein in its entirety.

The invention claimed is:

1. A communication apparatus comprising:
a receiving unit which receives a search signal for searching for a provider of communication parameters, wherein the communication parameters comprise information relating to at least one of an encryption method, an encryption key, an authentication method, and an authentication key for a wireless communication;
a notification unit which notifies, upon reception of the search signal by the receiving unit, the provider of the reception of the search signal; and
a control unit which performs, upon reception of the search signal by the receiving unit, (i) deterring a predetermined broadcast signal transmission from the communication apparatus, and (ii) deterring a response signal transmission for the search signal.

2. The communication apparatus according to claim 1, wherein the notification unit notifies the provider of reception of the search signal if the communication apparatus is an apparatus which has received the communication parameters from the provider.

3. The communication apparatus according to claim 1, wherein the receiving unit receives the search signal transmitted via a wireless communication.

4. The communication apparatus according to claim 3, wherein the wireless communication is a wireless LAN complying with the IEEE 802.11 standard series.

5. The communication apparatus according to claim 1, wherein the communication apparatus communicates in an ad-hoc network.

6. A communication apparatus comprising:
a receiving unit which receives a search signal for searching for a provider of communication parameters, wherein the communication parameters comprise information relating to at least one of an encryption method, an encryption key, an authentication method, and an authentication key for a wireless communication; and
a control unit which performs, upon reception of the search signal by the receiving unit while the communication apparatus is not the provider and is an apparatus which transmits a response signal for the search signal, (i) deterring a predetermined broadcast signal transmission from the communication apparatus, and (ii) deterring a response signal transmission for the search signal.

7. The communication apparatus according to claim 6, wherein the receiving unit receives the search signal transmitted via a wireless communication.

8. The communication apparatus according to claim 7, wherein the wireless communication is a wireless LAN complying with the IEEE 802.11 standard series.

9. The communication apparatus according to claim 6, wherein the communication apparatus communicates in an ad-hoc network.

10. A communication method for a communication apparatus, comprising:
a determination step of determining that the communication apparatus receives a search signal for searching for a provider of communication parameters if the communication apparatus is not the provider of the communication parameters, wherein the communication parameters comprise information relating to at least one of an encryption method, an encryption key, an authentication method, and an authentication key for a wireless communication;
a notification step of notifying the provider that the communication apparatus has received the search signal if it is determined in the determination step that the communication apparatus has received the search signal; and
a control step of performing, upon reception of the search signal, (i) deterring a predetermined broadcast signal transmission from the communication apparatus, and (ii) deterring a response signal transmission for the search signal.

11. A communication method for a communication apparatus, comprising:
a determination step of determining that the communication apparatus has received a search signal for searching for a provider of communication parameters if the communication apparatus is not the provider of the communication parameters, wherein the communication parameters comprise information relating to at least one of an encryption method, an encryption key, an authentication method, and an authentication key for a wireless communication; and
a control step of performing, upon reception of the search signal while the communication apparatus is not the provider and is an apparatus which transmits a response signal for the search signal, (i) deterring a predetermined broadcast signal transmission from the communication apparatus, and (ii) deterring a response signal transmission for the search signal.

12. A communication apparatus comprising:
a receiving unit which receives a search signal for searching for a provider of communication parameters, wherein the communication parameters comprise information relating to at least one of an encryption method, an encryption key, an authentication method, and an authentication key for a wireless communication;

a notification unit which notifies, upon reception of the search signal by the receiving unit, the provider of the reception of the search signal; and a control unit which performs, upon reception of the search signal by the receiving unit, (i) deterring the response signal transmission for the search signal, and (ii) decreasing the transmission frequency of the predetermined broadcast signal transmission from the communication apparatus.

13. The communication apparatus according to claim 12, wherein the notification unit notifies the provider of reception of the search signal if the communication apparatus is an apparatus which has received the communication parameters from the provider.

14. The communication apparatus according to claim 12, wherein the receiving unit receives the search signal transmitted via a wireless communication.

15. The communication apparatus according to claim 14, wherein the wireless communication is a wireless LAN complying with the IEEE 802.11 standard series.

16. The communication apparatus according to claim 12, wherein the communication apparatus communicates in an ad-hoc network.

17. A communication apparatus comprising:

a receiving unit which receives a search signal for searching for a provider of communication parameters, wherein the communication parameters comprise information relating to at least one of an encryption method, an encryption key, an authentication method, and an authentication key for a wireless communication; and a control unit which performs, upon reception of the search signal by the receiving unit while the communication apparatus is not the provide and is an apparatus which transmits a response signal for the search signal, (i) deterring the response signal transmission for the search signal, and (ii) decreasing the transmission frequency of the predetermined broadcast signal transmission from the communication apparatus.

18. The communication apparatus according to claim 17, wherein the receiving unit receives the search signal transmitted via a wireless communication.

19. The communication apparatus according to claim 18, wherein the wireless communication is a wireless LAN complying with the IEEE 802.11 standard series.

20. The communication apparatus according to claim 17, wherein the communication apparatus communicates in an ad-hoc network.

21. A communication method for a communication apparatus, comprising:

a determination step of determining that the communication apparatus receives a search signal for searching for a provider of communication parameters if the communication apparatus is not the provider of the communication parameters, wherein the communication parameters comprise information relating to at least one of an encryption method, an encryption key, an authentication method, and an authentication key for a wireless communication;

a notification step of notifying the provider that the communication apparatus has received the search signal if it is determined in the determination step that the communication apparatus has received the search signal; and a control step of performing, upon reception of the search signal, (i) deterring a response signal transmission for the search signal, and (ii) decreasing a transmission frequency of the predetermined broadcast signal transmission from the communication apparatus.

22. A communication method for a communication apparatus, comprising:

a determination step of determining that the communication apparatus has received a search signal for searching for a provider of communication parameters if the communication apparatus is not the provider of the communication parameters, wherein the communication parameters comprise information relating to at least one of an encryption method, an encryption key, an authentication method, and an authentication key for a wireless communication; and a control step of performing, upon reception of the search signal while the communication apparatus is not the provider and is an apparatus which transmits a response signal for the search signal, (i) deterring a response signal transmission for the search signal, and (ii) decreasing a transmission frequency of the predetermined broadcast signal transmission from the communication apparatus.

* * * * *